(12) United States Patent
Hirano

(10) Patent No.: US 11,680,594 B2
(45) Date of Patent: Jun. 20, 2023

(54) HOLLOW CHAMBER BLOCKING TOOL

(71) Applicant: HONDA MOTOR CO., LTD., Tokyo (JP)

(72) Inventor: Katsumi Hirano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 263 days.

(21) Appl. No.: 17/113,177

(22) Filed: Dec. 7, 2020

(65) Prior Publication Data

US 2021/0199144 A1    Jul. 1, 2021

(30) Foreign Application Priority Data

Dec. 25, 2019  (JP) .............................. JP2019-233903

(51) Int. Cl.
*F16B 5/06*    (2006.01)

(52) U.S. Cl.
CPC .................................. *F16B 5/0657* (2013.01)

(58) Field of Classification Search
CPC .................................................... F16B 5/0657
See application file for complete search history.

(56) References Cited

U.S. PATENT DOCUMENTS

| | | | | |
|---|---|---|---|---|
| 4,534,088 A * | 8/1985 | Rieke | .................... | F16B 5/0664 24/297 |
| 5,046,775 A * | 9/1991 | Marcum, Jr. | ......... | F16B 21/086 24/297 |
| 5,082,323 A * | 1/1992 | Dowd | ................. | B60R 13/0225 24/297 |
| 5,331,525 A * | 7/1994 | Lawassani | ............. | B60J 3/0208 296/214 |
| 5,653,496 A * | 8/1997 | Mori | ...................... | B60J 3/0217 296/187.05 |
| 5,662,375 A * | 9/1997 | Adams | ................... | B60N 3/026 248/222.12 |
| 5,688,022 A * | 11/1997 | Adams | ................... | B62D 65/14 296/214 |
| 5,752,853 A * | 5/1998 | Curtindale | ............. | B60J 3/0217 248/222.12 |

(Continued)

FOREIGN PATENT DOCUMENTS

| | | |
|---|---|---|
| CN | 109572587 | 4/2019 |
| JP | 09-48038 | 2/1997 |

(Continued)

OTHER PUBLICATIONS

Chinese Office Action for Chinese Patent Application No. 202011419813.6 dated Sep. 5, 2022.
Japanese Office Action for Japanese Patent Application No. 2019-233903 dated Mar. 15, 2022.

*Primary Examiner* — Jason W San
(74) *Attorney, Agent, or Firm* — Amin, Turocy & Watson, LLP

(57) ABSTRACT

A hollow chamber blocking tool includes: a first blocking tool having a first foamable base material on a first holder plate; and a second blocking tool having a second foamable base material on a second holder plate. The first blocking tool includes a steel plate fixing portion locked to a steel plate. The second blocking tool includes an integrated portion locked to the steel plate fixing portion. The second holder plate includes a rotating portion rotatably connected to the first blocking tool.

10 Claims, 8 Drawing Sheets

(56) References Cited

U.S. PATENT DOCUMENTS

| | | | | |
|---|---|---|---|---|
| 6,368,009 | B1 * | 4/2002 | Noda | F16B 19/1081 |
| | | | | 403/397 |
| 6,679,538 | B1 * | 1/2004 | Sturt | B60J 3/0217 |
| | | | | 296/187.05 |
| 7,344,331 | B2 * | 3/2008 | Kobayashi | B60R 13/04 |
| | | | | 411/908 |
| 7,347,655 | B2 * | 3/2008 | Nagasawa | B62D 25/24 |
| | | | | 24/297 |
| 7,419,206 | B2 * | 9/2008 | Slobodecki | B60J 3/0217 |
| | | | | 24/297 |
| 7,435,031 | B2 * | 10/2008 | Granata | F16B 5/0628 |
| | | | | 403/329 |
| 2009/0233055 | A1 * | 9/2009 | White | B62D 29/002 |
| | | | | 428/192 |
| 2016/0375852 | A1 * | 12/2016 | Yamamoto | F16B 21/086 |
| | | | | 24/297 |
| 2020/0391808 | A1 * | 12/2020 | Chae | B62D 21/00 |

FOREIGN PATENT DOCUMENTS

| | | | | |
|---|---|---|---|---|
| JP | 10-71628 | | 3/1998 | |
| JP | 2002-347058 | | 12/2002 | |
| JP | 2004-230834 | | 8/2004 | |
| JP | 2004230834 | A * | 8/2004 | |
| JP | 2006-056190 | | 3/2006 | |
| JP | 3819139 | B2 * | 9/2006 | |
| JP | 2011-514289 | | 5/2011 | |
| WO | WO-2009117376 | A1 * | 9/2009 | B62D 29/002 |

\* cited by examiner

HOLLOW CHAMBER BLOCKING TOOL

CROSS-REFERENCE TO RELATED APPLICATION

Priority is claimed on Japanese Unexamined Patent Application Publication No. 2019-233903, filed on Dec. 25, 2019, the contents of which are incorporated herein by reference.

BACKGROUND

Field of the Invention

The present invention relates to a hollow chamber blocking tool.

Background

As a hollow structure, for example, a structure in which a hollow cross-section is formed by an outer panel and an inner panel, a steel plate is disposed inside the hollow cross-section as a reinforcement member, and thereby the inside of the hollow cross-section is blocked in two closed cross-sections is known. Further, a structure in which the inside of the hollow structure (that is, a hollow chamber) is blocked by a hollow chamber blocking tool to thereby improve vibration damping and soundproofing effects is also known.

In this hollow chamber blocking tool, for example, a temporary fixing clip of the hollow chamber blocking tool is temporarily fixed to an attachment hole of the steel plate while a connection member of the hollow chamber blocking tool is inserted into the attachment hole of the steel plate. Thus, the hollow chamber blocking tool is attached to the steel plate in a temporary fixed state. In this state, a fixing clip is fitted into a latch hole of the connection member. Accordingly, the hollow chamber blocking tool can be assembled to the steel plate (for example, see Japanese Unexamined Patent Application Publication No. 2006-56190).

SUMMARY

However, in order to assemble the hollow chamber blocking tool disclosed in Japanese Unexamined Patent Application No. 2006-56190 to the steel plate, the temporary fixing clip of the connection member needs to be temporarily fixed to the attachment hole of the steel plate and the fixing clip needs to be fitted into the latch hole of the connection member. Therefore, since the number of components of the hollow chamber blocking tool increases, improving the workability of assembling the hollow chamber blocking tool to the steel plate (that is, the hollow chamber) is hindered.

Further, it is difficult to prevent rattling of the hollow chamber blocking tool with respect to the steel plate (the hollow chamber) and to secure the stability of the hollow chamber blocking tool during the transportation of the hollow structure to which the hollow chamber blocking tool is assembled.

An object of an aspect of the present invention is to provide a hollow chamber blocking tool capable of decreasing the number of components, capable of improving assembling workability, and capable of securing stability during transportation by preventing rattling.

A hollow chamber blocking tool according to a first aspect of the present invention includes: a first blocking tool having a foamable base material on a first holder plate; and a second blocking tool having a foamable base material on a second holder plate, wherein at least two hollow chambers partitioned by a steel plate are blocked by the first blocking tool and the second blocking tool, wherein the first blocking tool includes a steel plate fixing portion locked to the steel plate, wherein the second blocking tool includes an integrated portion connected to the first blocking tool through the second holder plate and locked to the steel plate fixing portion, and wherein the second holder plate includes a rotating portion rotatably connected to the first blocking tool.

According to this configuration, the steel plate fixing portion of the first blocking tool is temporarily fixed to one surface of the steel plate and the second blocking tool can be rotated to the other surface of the steel plate about the rotating portion. The integrated portion of the second blocking tool can be locked to the steel plate fixing portion by rotating the second blocking tool. Thus, the first blocking tool and the second blocking tool can be integrally locked while sandwiching the steel plate. Accordingly, the hollow chamber blocking tool can be assembled to the hollow chamber by simply locking the steel plate fixing portion and the integrated portion, and the number of components of the hollow chamber blocking tool can be decreased.

Further, the first blocking tool and the second blocking tool can be strongly fixed by locking the integrated portion to the steel plate fixing portion. Thus, the first blocking tool and the second blocking tool can be strongly integrated with each other. Accordingly, it is possible to prevent rattling of the hollow chamber blocking tool with respect to the hollow chamber and to secure the stability of the hollow chamber blocking tool during the transportation of the hollow chamber.

Further, the steel plate fixing portion and the integrated portion can be integrally locked while the first blocking tool and the second blocking tool sandwich the steel plate. Thus, it is possible to simultaneously perform the operation of sandwiching the steel plate between the first blocking tool and the second blocking tool and the operation of locking the integrated portion with the steel plate fixing portion as a single operation. Accordingly, it is possible to improve the assembling workability of assembling the hollow chamber blocking tool to the hollow chamber.

A second aspect of the present invention is the hollow chamber blocking tool according to the first aspect, wherein the steel plate fixing portion may include: a first locking claw fitted into an attachment hole of the steel plate and locked to a hole edge of the attachment hole; and a second locking claw locked to the integrated portion, and the integrated portion may include a third locking claw locked to the second locking claw.

According to this configuration, the steel plate fixing portion includes the first locking claw and the second locking claw. Then, the first locking claw is locked to the hole edge of the steel plate, and the third locking claw of the integrated portion is locked to the second locking claw. Thus, the steel plate fixing portion can be fixed in a stable state by the hole edge of the steel plate and the third locking claw of the integrated portion. Accordingly, the hollow chamber blocking tool can be reliably locked to the steel plate.

Further, the hollow chamber blocking tool can be easily assembled to the steel plate (that is, the hollow chamber) by a simple operation in which the first locking claw is locked to the hole edge of the steel plate and the third locking claw of the integrated portion is locked to the second locking claw.

A third aspect of the present invention is the hollow chamber blocking tool according to the second aspect, wherein the steel plate fixing portion may include a first protrusion portion having the first locking claw formed on an outer surface and the second locking claw formed on an inner surface, the integrated portion may include a second protrusion portion having the third locking claw formed on an outer surface, and at least a pair of the first protrusion portions may be symmetrically disposed about a fixed axis of the steel plate fixing portion and the integrated portion.

According to this configuration, at least a pair of the first protrusion portions are symmetrically disposed about the axis. That is, the second protrusion portion can be inserted between at least the pair of first protrusion portions. Thus, the third locking claw is engaged with the second locking claw, and the first locking claw can be pressed toward the hole edge of the steel plate with this engagement. Accordingly, the third locking claw is strongly engaged with the second locking claw, the first locking claw can be strongly engaged with the hole edge of the steel plate, and the hollow chamber blocking tool can be strongly fixed to the steel plate.

A fourth aspect of the present invention is the hollow chamber blocking tool according to the second aspect, wherein the steel plate fixing portion may include a boss-shaped first protrusion portion with a recess having the first locking claw formed on an outer surface and the second locking claw formed on an inner surface, and the integrated portion may include a second protrusion portion accommodated in the recess and having the third locking claw formed on an outer surface.

According to this configuration, the second protrusion portion can be pressed into the recess of the first protrusion portion while the first locking claw is locked to the hole edge of the steel plate. Thus, the third locking claw is engaged with the second locking claw, and the first locking claw can be pressed toward the hole edge of the steel plate with this engagement. Accordingly, the third locking claw is strongly engaged with the second locking claw, the first locking claw can be strongly engaged with the hole edge of the steel plate, and the hollow chamber blocking tool can be strongly fixed to the steel plate.

Further, the hollow chamber blocking tool can be strongly fixed to the steel plate by pressing the second protrusion portion into the recess of the first protrusion portion. Accordingly, the hollow chamber blocking tool can be easily assembled to the steel plate (that is, the hollow chamber) with a simple operation, and the assembling workability can be improved.

A fifth aspect of the present invention is the hollow chamber blocking tool according to any of the first to fourth aspects, wherein the rotating portion may include a connection portion fixed to the foamable base material of the first blocking tool in the second holder plate.

According to this configuration, the rotating portion of the second holder plate (specifically, the connection portion) is fixed (adhered) to the foamable base material of the first blocking tool. Thus, the second holder plate (that is, the second blocking tool) can be rotated toward the steel plate by bending and deforming the foamable base material of the first blocking tool at the connection portion. Accordingly, the third locking claw of the second blocking tool can be locked to the second locking claw of the second blocking tool.

The connection portion of the rotating portion can be easily fixed to the foamable base material of the first blocking tool when the first blocking tool and the second blocking tool are molded.

A sixth aspect of the present invention is the hollow chamber blocking tool according to the fifth aspect, wherein the rotating portion may include a hinge portion in addition to the connection portion fixed to the foamable base material of the first blocking tool.

According to this configuration, the second holder plate (that is, the second blocking tool) can be rotated toward the steel plate by bending and deforming the hinge portion of the rotating portion. Accordingly, the third locking claw of the second blocking tool can be locked to the second locking claw of the second blocking tool.

The hinge portion can be easily formed when the second holder plate is molded with a resin by forming the resin to have a thin thickness.

A seventh aspect of the present invention is the hollow chamber blocking tool according to any of the second to fourth aspects, wherein the first blocking tool may include a lip portion sandwiching the steel plate in cooperation with the first locking claw while the first locking claw is locked to the hole edge.

According to this configuration, the first blocking tool includes the lip portion and sandwiches the steel plate with the lip portion in cooperation with the first locking claw. Thus, a first gap can be formed between the first blocking tool and the steel plate. Accordingly, the rust preventive paint (electrodeposition paint) for the steel plate can be applied to the steel plate by allowing the rust preventive paint to enter the first gap.

An eighth aspect of the present invention is the hollow chamber blocking tool according to the seventh aspect, wherein the second holder plate may include a steel plate contact surface contacting the steel plate while the third locking claw is locked to the second locking claw.

According to this configuration, the second holder plate includes the steel plate contact surface, and the steel plate contact surface is brought into contact with the steel plate. Thus, a second gap can be formed between the second blocking tool and the steel plate. Accordingly, the rust preventive paint (electrodeposition paint) for the steel plate can be applied to the steel plate by allowing the rust preventive paint to enter the second gap.

A ninth aspect of the present invention is the hollow chamber blocking tool according to the eighth aspect, wherein the steel plate contact surface may contact a raised portion formed in a flange portion joinable to an outer shell of the hollow chamber in the steel plate.

According to this configuration, the hollow chamber blocking tool can be attached to the vehicle body by welding the flange portion of the steel plate (portion excluding the raised portion) to the outer shell of the hollow chamber (that is, the vehicle body) after assembling the hollow chamber blocking tool to the steel plate.

A tenth aspect of the present invention is the hollow chamber blocking tool according to any of the first to ninth aspects, wherein the hollow chamber blocking tool may be applied to a skeleton member of a vehicle.

According to this configuration, for example, when the hollow chamber blocking tool is attached to the skeleton member between a rear wheel house and a side door opening, the transmission of road noise from the rear wheel to a vehicle interior can be suppressed by the hollow chamber blocking tool, and performance against side collision can be also improved.

According to the aspect of the present invention, it is possible to decrease the number of components, improve the assembling workability, and secure the stability during transportation by preventing rattling.

DESCRIPTION OF EMBODIMENTS

Hereinafter, embodiments of the present invention will be described with reference to the drawings.

First Embodiment

Figure 1:
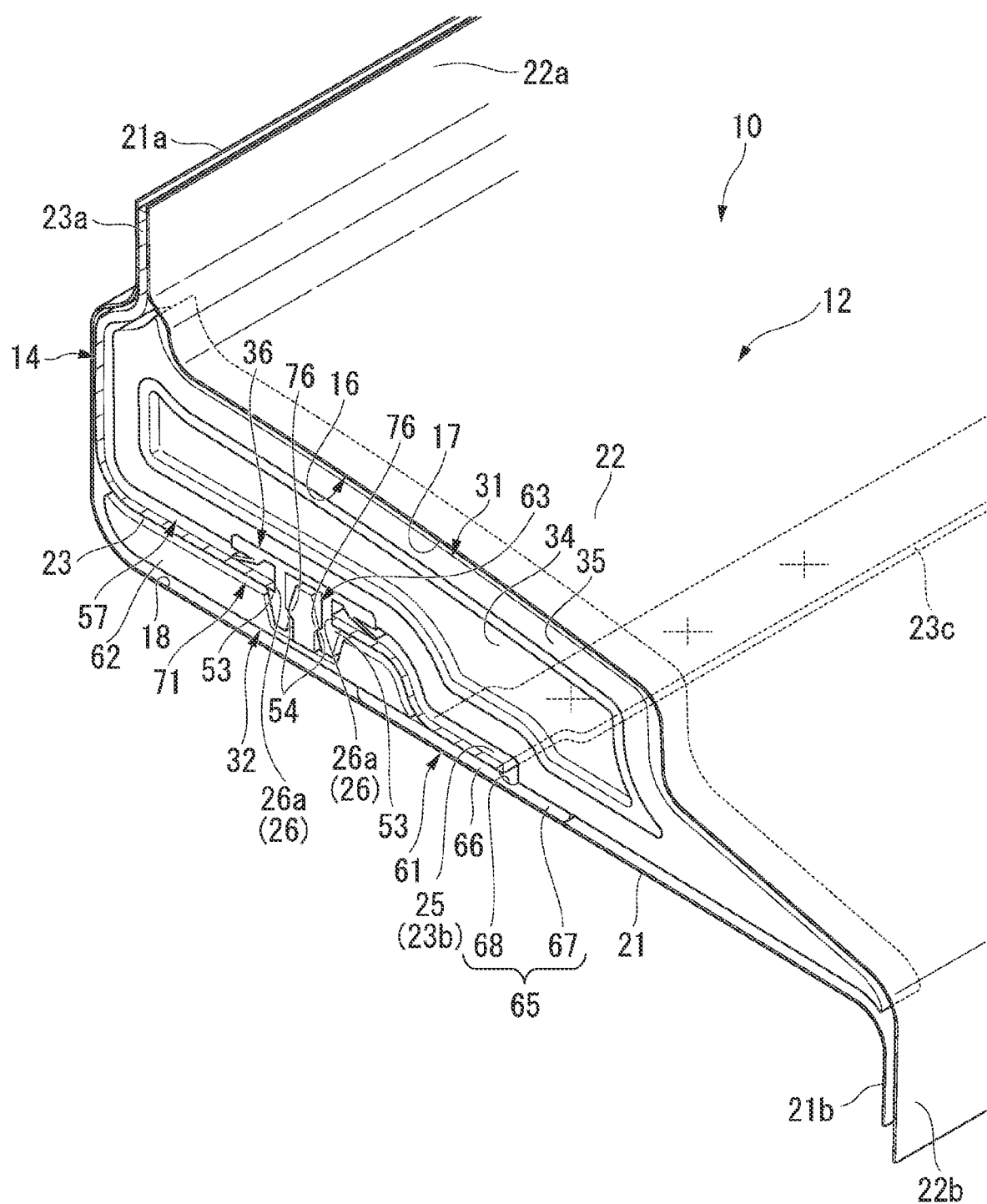
FIG. 1 is a perspective view showing a state in which a hollow chamber blocking tool of a first embodiment according to the present invention is attached to a hollow structure.
Figure 2:
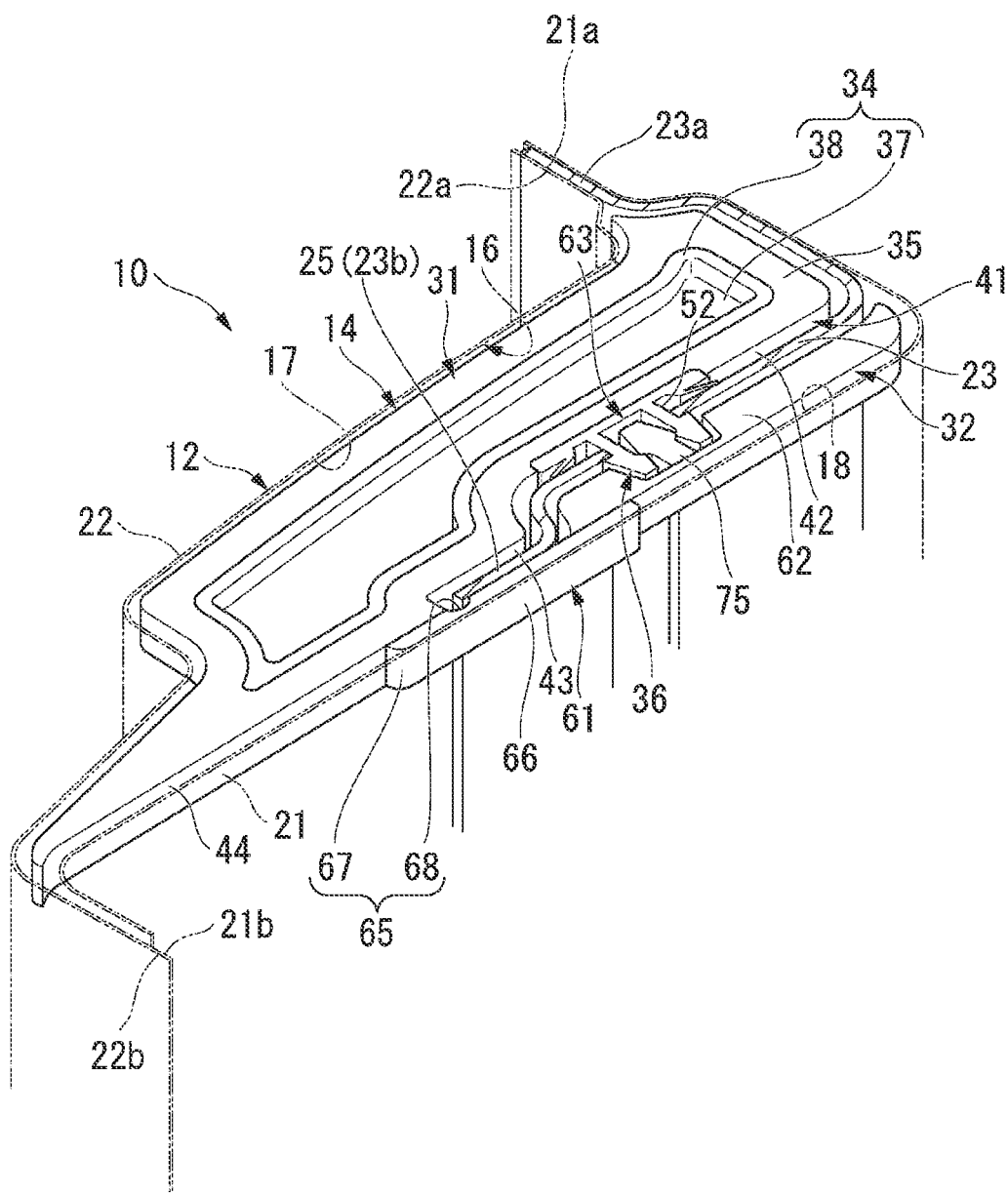
FIG. 2 is a perspective view from an inner panel side of the hollow structure to which the hollow chamber blocking tool of the first embodiment is assembled.

As shown in FIGS. 1 and 2, a vehicle 10 includes a hollow structure (skeleton member) 12 and a hollow chamber blocking tool 14. For example, the hollow chamber blocking tool 14 is a device for blocking the inside of a hollow chamber 16 of the hollow structure 12 such as a body pillar, a roof side panel, and a rear wheel house of the vehicle 10 with a foam and improving the effects of vibration damping, soundproofing, reinforcement, and the like of the hollow structure 12.

The hollow structure 12 is formed into a closed cross-section, for example, by spot-welding an inner panel 21 and an outer panel 22 in one flange portions 21a and 22a and other flange portions 21b and 22b. A steel plate (reinforcement panel) 23 is disposed between the inner panel 21 and the outer panel 22. The steel plate 23 is a reinforcement member for reinforcing the hollow structure 12.

The steel plate 23 includes one flange portion 23a and another flange portion 23b. The one flange portion 23a is sandwiched between the other flange portions 21a and 22a. The other flange portion 23b is disposed inside the hollow chamber 16 and includes a raised portion 25. Hereinafter, the other flange portion 23b will be described as the "flange portion 23b."

The flange portion 23b is a portion in which a portion 23c excluding the raised portion 25 can be joined to the inner panel (an outer shell (outer wall)) of the hollow chamber 16) 21. An attachment hole 26 is formed in the steel plate 23.

The attachment hole 26 is formed in, for example, a rectangular shape by a hole edge 26a.

The hollow chamber 16 of the hollow structure 12 is partitioned by the steel plate 23 into two hollow chambers, a first hollow chamber 17 and a second hollow chamber 18. That is, the outer panel 22 and the steel plate 23 constitute the first hollow chamber 17. Further, the inner panel 21 and the steel plate 23 constitute the second hollow chamber 18. The hollow chamber blocking tool 14 is accommodated in the first hollow chamber 17 and the second hollow chamber 18. The hollow chamber blocking tool 14 is locked to the steel plate 23 (specifically, the hole edge 26a of the attachment hole 26).

Figure 3:
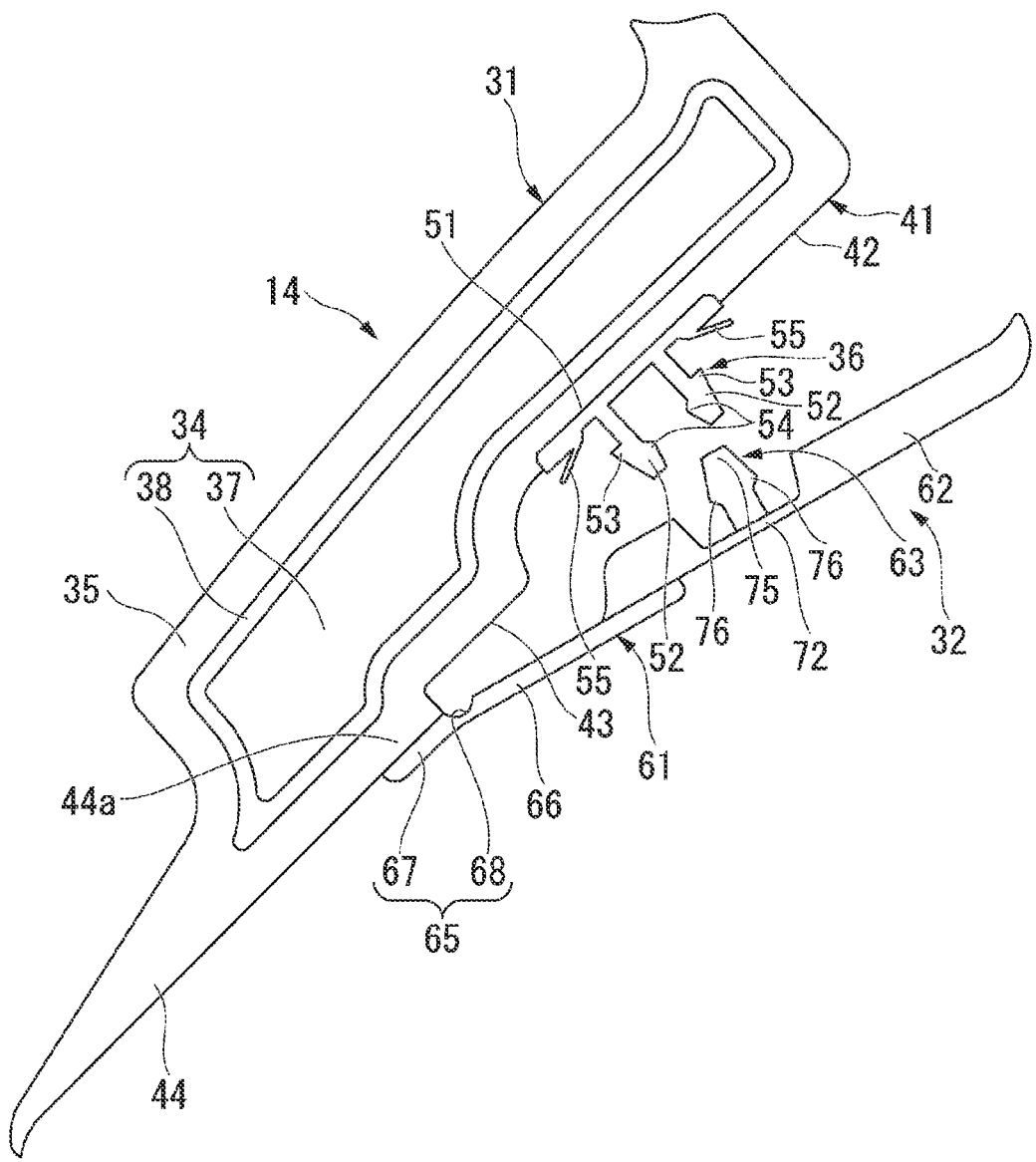
FIG. 3 is a plan view showing the hollow chamber blocking tool of the first embodiment.

As shown in FIGS. 2 and 3, the hollow chamber blocking tool 14 includes a first blocking tool 31 accommodated in the first hollow chamber 17 and a second blocking tool 32 accommodated in the second hollow chamber 18.

The first blocking tool 31 includes a first holder plate 34, a first foamable base material (foamable base material) 35, and a steel plate fixing portion 36.

The first holder plate 34 is formed by, for example, injection-molding a heat-resistant thermoplastic synthetic resin (for example, 66 nylon) into a plate shape. The first holder plate 34 includes a first plate 37 and a first outer peripheral portion 38. The first plate 37 is formed in a plate shape with an outer shape corresponding to the first hollow chamber 17 of the hollow structure 12 to be blocked. The first outer peripheral portion 38 is formed along the outer periphery of the first plate 37. The first foamable base material 35 is fixed along the outer periphery of the first outer peripheral portion 38 by, for example, adhesion.

The first foamable base material 35 is formed along the outer periphery of the first outer peripheral portion 38 to have an outer shape corresponding to the first hollow chamber 17 of the hollow structure 12 to be blocked.

The first foamable base material 35 is made of a foamable material, but can be preferably made of a synthetic resin-based foamable material mixed with a foaming agent that foams under external heating. Particularly preferably, the first foamable base material 35 can contain a synthetic resin having adhesiveness to a metal surface or a synthetic resin surface as a main component and be mixed with a fibrous substance such as glass fiber.

The first foamable base material 35 is made of a foamable material that foams due to heat during a baking process of a vehicle body (for example, at a temperature of about 110° C. to 190° C.) to become a foam. As a foamable material having such adhesiveness, for example, those disclosed in Japanese Unexamined Patent Application Publication No. 9-176356 are known.

The first foamable base material 35 includes a first attachment portion 41 facing the second blocking tool 32 or the steel plate 23. The first attachment portion 41 includes a first attachment step portion 42, a second attachment step portion 43, and a flat portion 44. The steel plate fixing portion 36 is fixed to, for example, the first attachment step portion 42 by adhesion.

Figure 4:
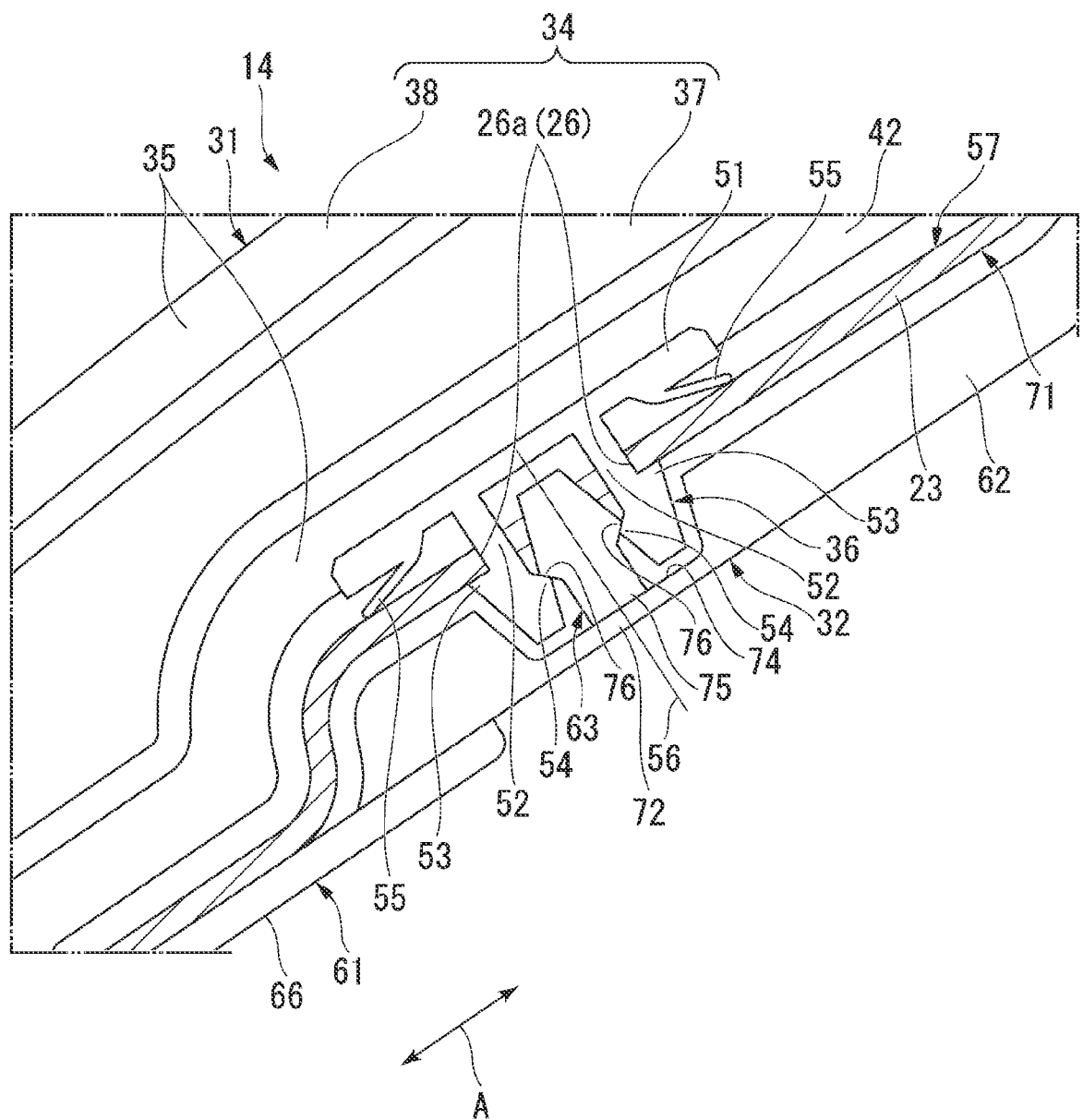
FIG. 4 is a plan view showing a state in which the hollow chamber blocking tool of the first embodiment is locked to a steel plate.

As shown in FIG. 4, the steel plate fixing portion 36 is made of, for example, the same heat-resistant thermoplastic synthetic resin as that of the first holder plate 34. The steel plate fixing portion 36 is formed to be lockable to the hole edge 26a of the attachment hole 26 of the steel plate 23. The steel plate fixing portion 36 includes a fixing base 51, a first protrusion portion 52, a first locking claw 53, a second locking claw 54, and a lip portion 55.

The fixing base 51 is fixed to, for example, the first attachment step portion 42 of the first foamable base material 35 by adhesion. The pair of first protrusion portions 52 are integrally formed with the fixing base 51. The pair of first protrusion portions 52 elastically deformably protrude from the fixing base 51 to the opposite side of the first foamable base material 35 with a gap therebetween in the longitudinal direction of the first blocking tool 31 (the direction indicated by an arrow A). The pair of first protrusion portions 52 are symmetrically disposed in the longitudinal direction about a fixed axis 56 of the steel plate fixing portion 36 and the integrated portion 63 (to be described later).

The first locking claw 53 and the second locking claw 54 are integrally formed with the first protrusion portion 52. The first locking claw 53 is integrally formed with the opposite surface of the other first protrusion portion 52 (hereinafter referred to as the outer surface) in the first protrusion portion 52. The first locking claw 53 is fitted into the attachment hole 26 of the steel plate 23 and is locked to the hole edge 26a of the attachment hole 26.

The second locking claw 54 is integrally formed with the surface facing the other first protrusion portion 52 (hereinafter referred to as the inner surface) in the first protrusion portion 52.

Further, the pair of lip portions 55 are integrally formed with the fixing base 51. The pair of lip portions 55 are disposed on the side opposite to the fixed axis 56 with respect to the first protrusion portion 52. The lip portions 55 protrude in a shape inclined from the fixing base 51 toward the opposite side of the first foamable base material 35 in a direction gradually moving away from the first protrusion portion 52.

The lip portions 55 can sandwich the steel plate 23 in cooperation with the first locking claw 53 while the first locking claw 53 is locked to the hole edge 26a of the steel plate 23 (specifically, the attachment hole 26).

Thus, the steel plate 23 is disposed with a first gap 57 with respect to the first blocking tool 31 (specifically, the first attachment step portion 42 and the second attachment step portion 43 of the first foamable base material 35).

The reason why the first gap 57 is formed between the first foamable base material 35 and the steel plate 23 will be described in detail later.

As shown in FIG. 3, the second blocking tool 32 is connected to the first blocking tool 31 through the second holder plate 61. The second blocking tool 32 includes a second holder plate 61, a second foamable base material (foamable base material) 62, and an integrated portion 63.

The second holder plate 61 is formed by, for example, injection-molding a heat-resistant thermoplastic synthetic resin (for example, 66 nylon) into a plate shape. The second holder plate 61 is formed in a flat plate shape and includes a rotating portion 65 and a steel plate contact surface portion (steel plate contact surface) 66.

The rotating portion 65 is formed at the base end portion of the second holder plate 61. The rotating portion 65 includes a connection portion 67 and a hinge portion 68. The connection portion 67 is fixed (connected) to a portion 44a adjacent to the second attachment step portion 43 in the flat portion 44 of the first foamable base material 35 (specifically, the first attachment portion 41) by, for example, adhesion.

The flat portion 44 is made of the first foamable base material 35. Thus, the portion 44a of the flat portion 44 can be bent and deformed at the connection portion 67. That is, the connection portion 67 is rotatably supported by the portion 44a of the flat portion 44. Thus, the second holder plate 61 (that is, the second blocking tool 32) can be rotated toward the steel plate 23 (see FIG. 2) about the connection portion 67 by bending and deforming the portion 44a of the flat portion 44 at the connection portion 67.

Additionally, the connection portion 67 can easily fix (adhere) the portion 44a of the flat portion 44 of the first foamable base material 35 of the first blocking tool 31 when the first blocking tool 31 and the second blocking tool 32 are molded.

The hinge portion 68 is formed adjacent to the connection portion 67. The hinge portion 68 is a portion which is formed to be plastically deformable, for example, because the resinous second holder plate 61 is formed to have a thin thickness. Thus, the second holder plate 61 (that is, the second blocking tool 32) can be rotated toward the steel plate 23 about the hinge portion 68 by bending and deforming the hinge portion 68.

Additionally, the hinge portion 68 can be easily formed when the second holder plate 61 is molded with a resin by forming the resinous second holder plate to have a thin thickness.

As shown in FIGS. 1 and 2, the steel plate contact surface portion 66 is formed adjacent to the rotating portion 65 in the second holder plate 61. The steel plate contact surface portion 66 is a portion that contacts the raised portion 25 of the steel plate 23 (specifically, the flange portion 23b) while a third locking claw 76 to be described later is locked to the second locking claw 54. In a state in which the steel plate contact surface portion 66 contacts the raised portion 25, the second blocking tool 32 (specifically, the second foamable base material 62) is disposed with a second gap 71 with respect to the steel plate 23.

The reason why the second gap 71 is formed between the steel plate 23 and the second foamable base material 62 will be described in detail later.

As shown in FIGS. 3 and 4, the base end portion of the second foamable base material 62 is fixed (connected) to the front end portion of the second holder plate 61 by, for example, adhering. The second foamable base material 62 is formed in an outer shape corresponding to the second hollow chamber 18 of the hollow structure 12 to be blocked (both are shown in FIG. 1). The second foamable base material 62 is made of the same foamable material as that of the first foamable base material 35.

The second foamable base material 62 is disposed at a position facing the first blocking tool 31 or the steel plate 23. The integrated portion 63 is fixed to, for example, the second attachment portion 72 of the second foamable base material 62 by adhering.

The integrated portion 63 is a member that is locked to the steel plate fixing portion 36. The integrated portion 63 is made of, for example, the same heat-resistant thermoplastic synthetic resin as that of the second holder plate 61. The integrated portion 63 includes an integrated base 74, a second protrusion portion 75, and a third locking claw 76.

The integrated base 74 is fixed to, for example, the second attachment portion 72 of the second foamable base material 62 by adhering. The second protrusion portion 75 is integrally formed with the integrated base 74. The second protrusion portion 75 protrudes from the integrated base 74 toward the steel plate fixing portion 36 (specifically, a gap between the pair of first protrusion portions 52). The second protrusion portion 75 is formed to be insertable into a gap between the pair of first protrusion portions 52. The second protrusion portion 75 is disposed coaxially with the fixed axis 56 while being inserted into a gap between the pair of first protrusion portions 52.

The pair of third locking claws 76 is integrally formed with the second protrusion portion 75. The pair of third locking claws 76 is formed at a position corresponding to the second locking claw 54 in the outer surface of the second protrusion portion 75. The third locking claw 76 is locked to the second locking claw 54 while the second protrusion portion 75 is inserted into a gap between the pair of first protrusion portions 52 and is disposed coaxially with the fixed axis 56.

In this way, at least the pair of first protrusion portions 52 is symmetrically disposed about the fixed axis 56. Thus, the second protrusion portion 75 can be inserted between the pair of first protrusion portions 52. Accordingly, the third locking claw 76 is engaged with the second locking claw 54 and the first locking claw 53 can be pressed toward the hole edge 26a of the steel plate 23 with this engagement.

Next, a procedure for assembling the hollow chamber blocking tool 14 to the hollow structure 12 will be described with reference to FIGS. 5 to 7.

Figure 5:
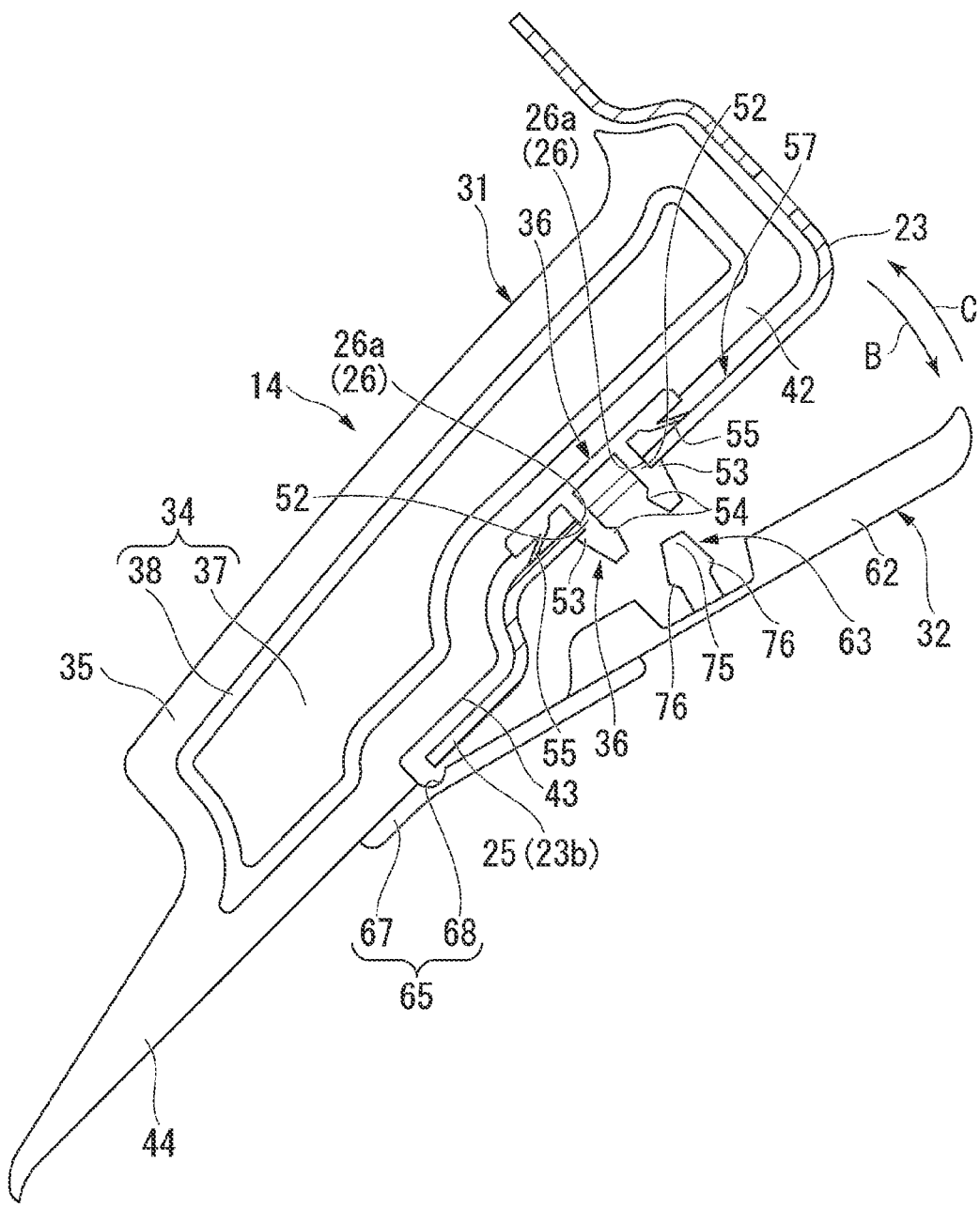
FIG. 5 is a plan view illustrating a procedure for temporarily fixing a steel plate fixing portion of a first blocking tool of the first embodiment to the steel plate.

As shown in FIG. 5, the second blocking tool 32 of the hollow chamber blocking tool 14 is rotated as indicated by an arrow B about the rotating portion 65 in a direction moving away from the first blocking tool 31. By the rotation of the second blocking tool 32, the second foamable base material 62 of the second blocking tool 32 is separated from the first attachment step portion 42 and the second attachment step portion 43 of the first blocking tool 31 and is maintained in an opened state.

In this state, the steel plate 23 is disposed between the second foamable base material 62 and the first and second attachment step portions 42 and 43. The pair of first protrusion portions 52 of the steel plate fixing portion 36 is fitted into the attachment hole 26 of the steel plate 23 and the pair of first locking claws 53 is locked to the hole edge 26a of the attachment hole 26. Accordingly, the steel plate fixing portion 36 of the first blocking tool 31 is temporarily fixed to one surface side of the steel plate 23.

In a state in which the steel plate fixing portion 36 is temporarily fixed to the steel plate 23, the pair of lip portions 55 comes into contact with the steel plate 23. Accordingly, the steel plate 23 is sandwiched between the lip portion 55 and the first locking claw 53 and the first gap 57 is formed between the first and second attachment step portions 42 and 43 of the first foamable base material 35 and the steel plate 23.

In this state, the second blocking tool 32 is rotated about the rotating portion 65 as indicated by an arrow C to the first blocking tool 31 (specifically, the other surface side of the steel plate 23).

Figure 6:
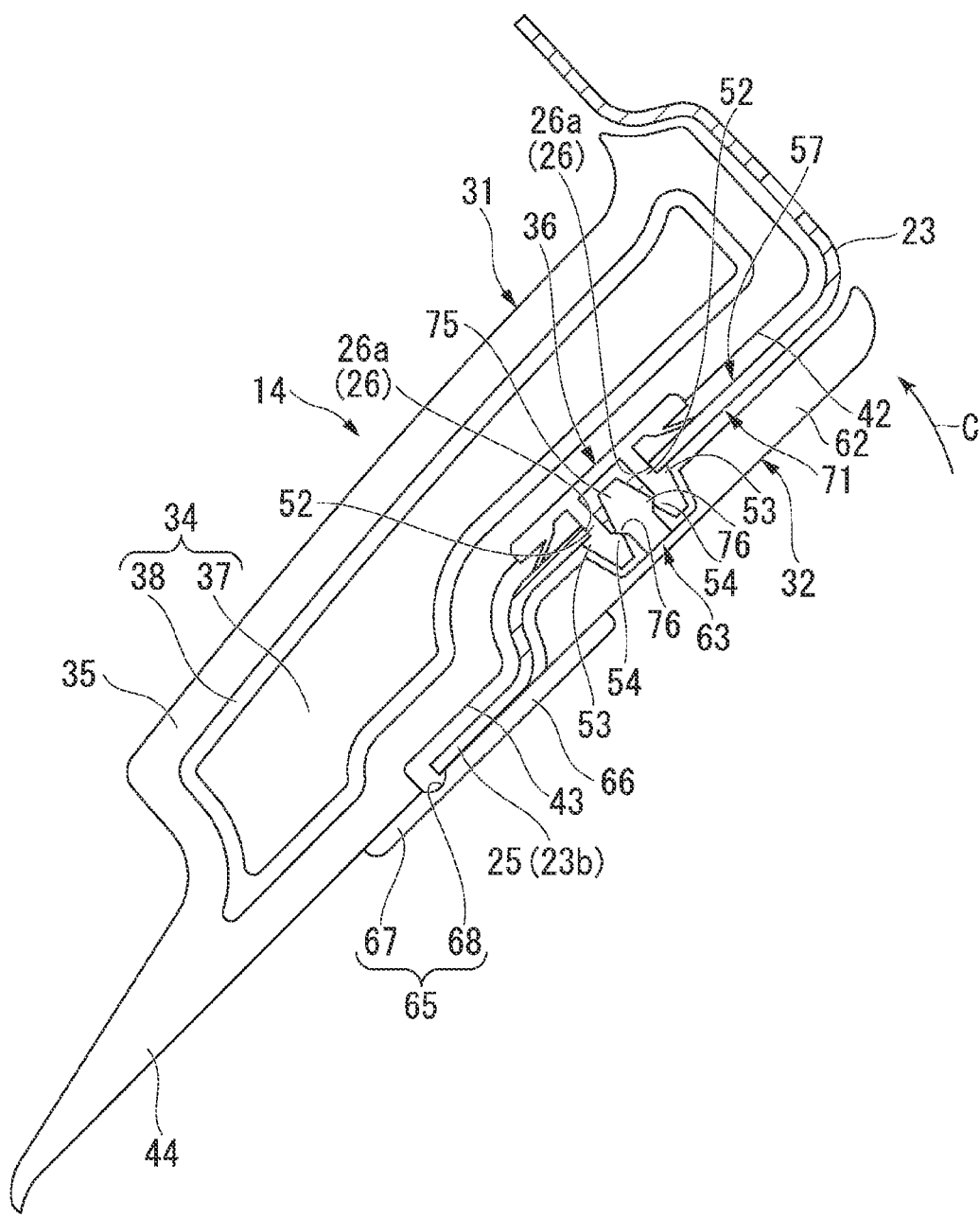
FIG. 6 is a plan view illustrating a procedure for assembling the hollow chamber blocking tool of the first embodiment to the steel plate.

As shown in FIG. 6, the second blocking tool 32 is rotated so that the second protrusion portion 75 is inserted into a gap between the pair of first protrusion portions 52. Thus, the pair of third locking claws 76 is locked to the pair of second locking claws 54. With this engagement, the first locking claw 53 can be pressed toward the hole edge 26a of the steel plate 23. Accordingly, the pair of third locking claws 76 is strongly engaged with the pair of second locking claws 54, the pair of first locking claws 53 can be strongly engaged with the hole edge 26a of the steel plate 23, and the hollow chamber blocking tool 14 can be strongly fixed to the steel plate 23.

Further, the hollow chamber blocking tool 14 can be easily assembled to the steel plate 23 (that is, the hollow chamber 16) by a simple operation in which the pair of first locking claws 53 is locked to the hole edge 26a of the steel plate 23 and the pair of third locking claws 76 is locked to the pair of second locking claws 54.

In a state in which the hollow chamber blocking tool 14 is strongly fixed to the steel plate 23, the steel plate contact surface portion 66 contacts the raised portion 25 of the steel plate 23 (specifically, the flange portion 23b). Accordingly, the second gap 71 is formed between the second blocking tool 32 (specifically, the second foamable base material 62) and the steel plate 23.

Figure 7:
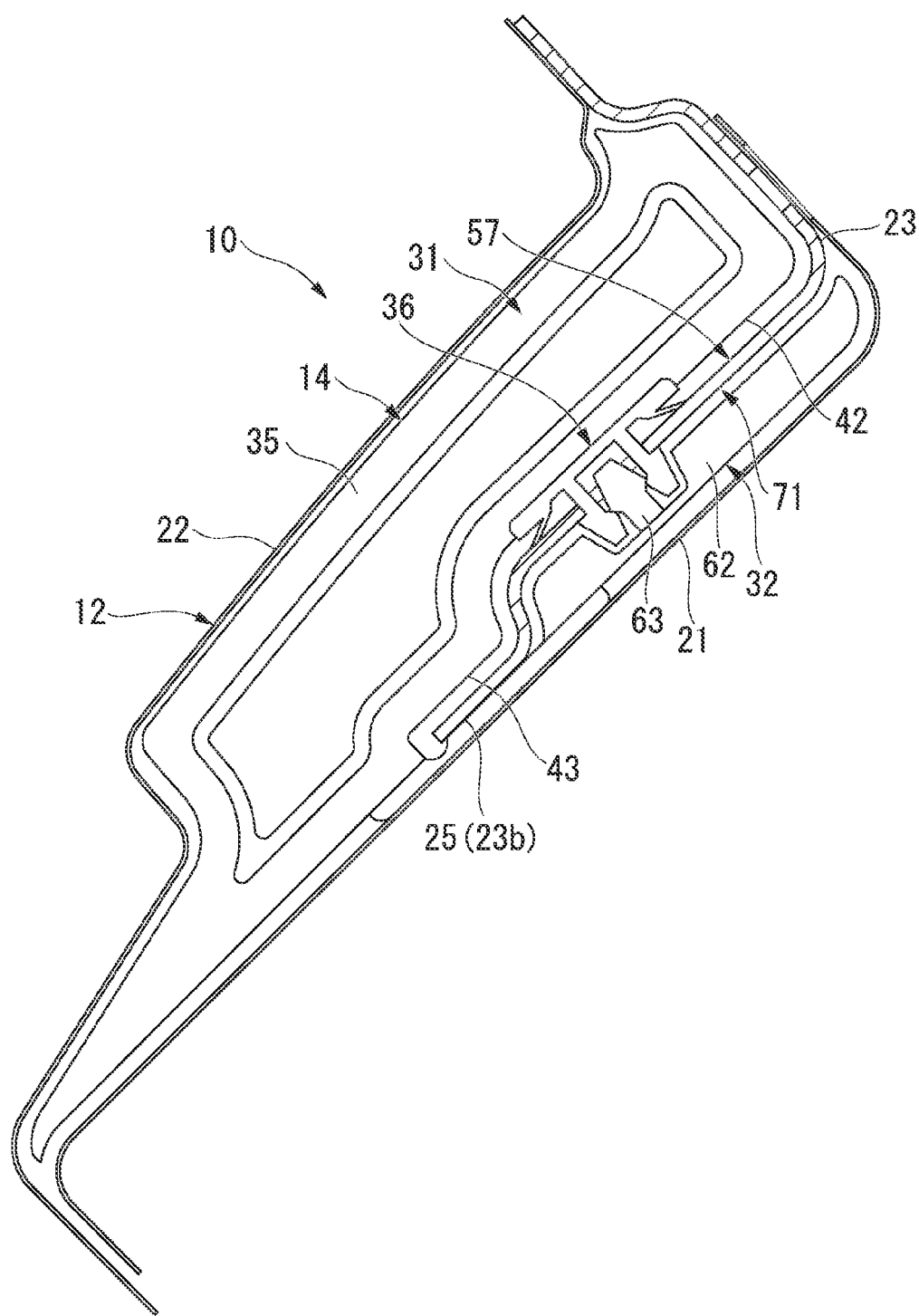
FIG. 7 is a plan view illustrating a procedure for bringing the hollow chamber blocking tool of the first embodiment into close contact with an inner wall surface of the hollow structure.

As shown in FIGS. 1 and 7, the hollow chamber blocking tool 14 fixed to the steel plate 23 is disposed between the inner panel 21 and the outer panel 22 together with the steel plate 23. The portion 23c excluding the raised portion 25 in the flange portion 23b of the steel plate 23 is joined to the inner panel 21 by, for example, spot-welding.

Thus, the first blocking tool 31 of the hollow chamber blocking tool 14 is disposed while being accommodated in the first hollow chamber 17 of the hollow structure 12. Further, the second blocking tool 32 of the hollow chamber blocking tool 14 is disposed while being accommodated in the second hollow chamber 18 of the hollow structure 12.

In this way, the hollow chamber blocking tool 14 can be attached to the vehicle body by joining the portion 23c of the flange portion 23b of the steel plate 23 to the hollow structure 12 (that is, the outer shell of the hollow chamber 16) after assembling the hollow chamber blocking tool 14 to the steel plate 23.

The hollow structure 12 (that is, the vehicle body) in which the hollow chamber blocking tool 14 is disposed is immersed into a paint tank for electrodeposition coating. Here, the hollow chamber blocking tool 14 is strongly fixed to the steel plate 23. Thus, even when a paint liquid for a rust preventive paint (electrodeposition paint) flows vigorously into the hollow structure 12, it is possible to prevent the hollow chamber blocking tool 14 from being fallen down by the liquid pressure of the paint liquid.

Further, the first gap 57 is formed between the steel plate 23 and the first and second attachment step portions 42 and 43 of the first foamable base material 35. Furthermore, the second gap 71 is formed between the second blocking tool 32 (specifically, the second foamable base material 62) and the steel plate 23.

Accordingly, the rust preventive paint can be applied to the steel plate 23 by allowing the rust preventive paint to enter the first gap 57 and the second gap 71. That is, electrodeposition coating can be applied to the inner and outer surfaces of the hollow structure 12. The electrodeposition coating is baked on the hollow structure 12 that has been electrodeposited in a heating furnace or the like. By heating during the baking process, the first foamable base material 35 and the second foamable base material 62 expand to become a foam. The inside of the hollow chamber 16 of the hollow structure 12 is blocked without a gap by this foam.

That is, the first foamable base material 35 and the second foamable base material 62 foam and expand due to external heating to form foams and follows the inner wall surface of the hollow structure 12 to be in close contact with the hollow structure 12. Thus, the inside of the first hollow chamber 17 is blocked without a gap by the first blocking tool 31. Further, the inside of the second hollow chamber 18 is blocked without a gap by the first blocking tool 31. Accordingly, the hollow chamber blocking tool 14 can improve the effects of vibration damping, soundproofing, reinforcement, and the like of the hollow structure 12.

Here, the hollow chamber blocking tool 14 is applied (attached) to, for example, a skeleton member between a rear wheel house and a side door opening of the vehicle 10. Accordingly, the transmission of road noise from the rear wheel to the vehicle interior can be suppressed by the hollow chamber blocking tool 14 and performance against side collision can be also improved.

As described above, according to the hollow chamber blocking tool 14 of the first embodiment, the steel plate fixing portion 36 of the first blocking tool 31 is temporarily fixed to one surface side of the steel plate 23 and the second blocking tool 32 can be rotated to the other surface side of the steel plate 23 about the rotating portion 65. The integrated portion 63 of the second blocking tool 32 can be locked to the steel plate fixing portion 36 by rotating the second blocking tool 32. Thus, the first blocking tool 31 and the second blocking tool 32 can be integrally locked while sandwiching the steel plate 23 therebetween. Accordingly, the hollow chamber blocking tool 14 can be assembled to the hollow chamber 16 by simply locking the steel plate fixing portion 36 and the integrated portion 63 and the number of components of the hollow chamber blocking tool 14 can be decreased.

Further, the first blocking tool 31 and the second blocking tool 32 can be strongly fixed by locking the integrated portion 63 to the steel plate fixing portion 36. Thus, the first blocking tool 31 and the second blocking tool 32 can be strongly integrated with each other. Accordingly, it is possible to prevent rattling of the hollow chamber blocking tool 14 with respect to the hollow structure 12 and to secure the stability of the hollow chamber blocking tool 14 during the transportation of the hollow structure 12.

Further, the steel plate fixing portion 36 and the integrated portion 63 can be integrally locked while the first blocking tool 31 and the second blocking tool 32 sandwich the steel plate 23. Thus, it is possible to simultaneously perform the operation of sandwiching the steel plate 23 between the first blocking tool 31 and the second blocking tool 32 and the operation of locking the integrated portion 63 by the steel plate fixing portion 36 as a single operation. Accordingly, it is possible to improve the assembling workability of assembling the hollow chamber blocking tool 14 to the hollow structure 12.

Second Embodiment

Next, a hollow chamber blocking tool 100 of a second embodiment will be described with reference to FIG. 8. Additionally, in the second embodiment, the same or similar components as or to those of the hollow chamber blocking tool 14 of the first embodiment will be denoted by the same reference numerals and detailed description thereof will be omitted.

Figure 8:
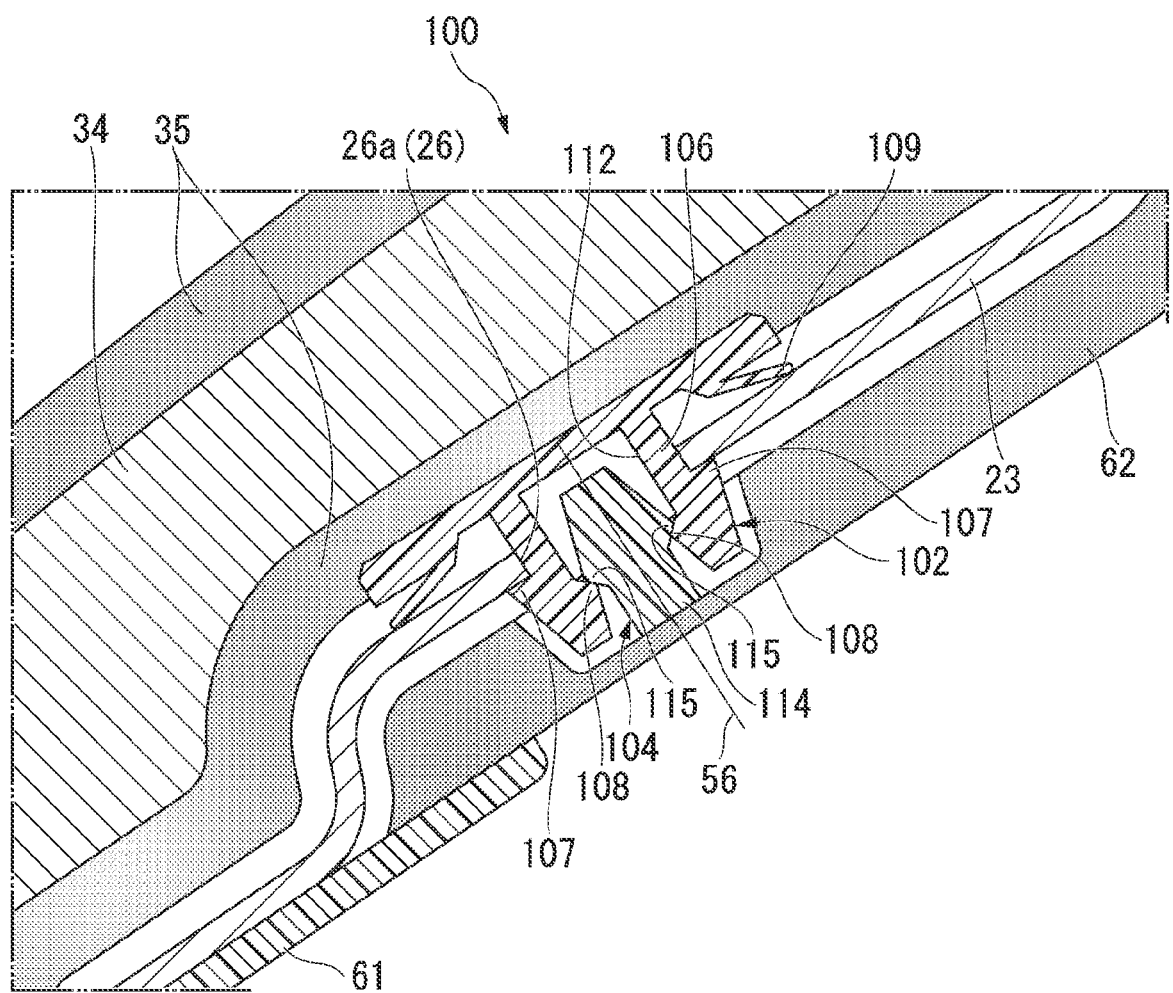
FIG. 8 is a plan view showing a state in which a hollow chamber blocking tool of a second embodiment according to the present invention is attached to a steel plate.

As shown in FIG. 8, the hollow chamber blocking tool 100 has a configuration in which the steel plate fixing portion 36 of the first embodiment is replaced with a steel plate fixing portion 102 and the integrated portion 63 is replaced with an integrated portion 104 and the other configurations are the same as those of the hollow chamber blocking tool 14 of the first embodiment.

The steel plate fixing portion 102 includes a first protrusion portion 106, a first locking claw 107, a second locking claw 108, and a lip portion 109. The first protrusion portion 106 is formed in a boss shape and includes a recess 112 formed coaxially with the fixed axis 56. The recess 112 has an opening at the front end portion of the first protrusion portion 106. The first locking claw 107 is formed in a ring shape along the circumferential direction in the outer peripheral surface (outer periphery) of the first protrusion portion 106. Additionally, a plurality of the first locking claws 107 may be formed at intervals in the circumferential direction of the outer peripheral surface.

The second locking claw 108 is formed in a ring shape along the circumferential direction in the inner peripheral surface (inner surface) of the first protrusion portion 106. Additionally, a plurality of the second locking claws 108 may be formed at intervals in the circumferential direction of the inner peripheral surface. The lip portion 109 is located at a distance outward from the first protrusion portion 106 and is formed in a ring shape along the outer peripheral surface of the first protrusion portion 106. Additionally, a plurality of the lip portions 109 may be formed at intervals in the circumferential direction.

The integrated portion 104 includes a second protrusion portion 114 and a third locking claw 115. The second protrusion portion 114 is formed to be accommodated in the recess 112. The third locking claw 115 is formed in a ring shape along the circumferential direction in the outer peripheral surface (outer periphery) of the second protrusion portion 114. Additionally, a plurality of the third locking claws 115 may be formed at intervals in the circumferential direction of the outer peripheral surface.

According to the hollow chamber blocking tool 100 of the second embodiment, the second protrusion portion 114 can be pressed into the recess 112 of the first protrusion portion 106 while the first locking claw 107 is locked to the hole edge 26a of the steel plate 23. Thus, the third locking claw 115 is engaged with the second locking claw 108 and the first locking claw 107 can be pressed toward the hole edge 26a of the steel plate 23 with this engagement.

Accordingly, the first locking claw 107 can be strongly engaged with the hole edge 26a of the steel plate 23 by strongly engaging the third locking claw 115 with the second locking claw 108. As a result, the hollow chamber blocking tool 100 can be strongly fixed to the steel plate 23.

Further, the hollow chamber blocking tool 100 can be strongly fixed to the steel plate 23 by pressing the second protrusion portion 114 into the recess 112 of the first protrusion portion 106. Accordingly, the hollow chamber blocking tool 100 can be easily assembled to the steel plate 23 (that is, the hollow chamber 16 (see FIG. 1)) by a simple operation and the assembling workability can be improved.

In the above-described first embodiment, an example in which the hollow chamber 16 of the hollow structure 12 is partitioned into two hollow chambers, the first hollow chamber 17 and the second hollow chamber 18, has been described, but the present invention is not limited thereto. As another example, the hollow chamber 16 may be partitioned into three or more hollow chambers.

In the above-described first embodiment, an example in which the steel plate fixing portion 36 is provided with the pair of first protrusion portions 52 has been described, but the number of the first protrusion portions 52 is not limited thereto. As another example, for example, three or more first protrusion portions 52 may be provided.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A hollow chamber blocking tool comprising:
   a first blocking tool having a foamable base material on a first holder plate; and a second blocking tool having a foamable base material on a second holder plate, wherein at least two hollow chambers partitioned by a steel plate are blocked by the first blocking tool and the second blocking tool, wherein the first blocking tool includes a steel plate fixing portion locked to the steel plate, wherein the second blocking tool includes an integrated portion connected to the first blocking tool through the second holder plate and locked to the steel plate fixing portion, wherein the second holder plate includes a rotating portion rotatably connected to the first blocking tool, wherein the foamable base material of the first blocking tool has a first attachment portion facing the second blocking tool, wherein the first attachment portion includes an attachment step portion to which the steel plate fixing portion is fixed and a flat portion which is provided adjacent to the attachment step portion and which extends in a direction separating away from the steel plate fixing portion, and wherein the rotating portion of the second holder plate includes a connection portion fixed to the flat portion of the foamable base material of the first blocking tool.

2. The hollow chamber blocking tool according to claim 1, wherein the steel plate fixing portion includes: a first locking claw fitted into an attachment hole of the steel plate and locked to a hole edge of the attachment hole; and a second locking claw locked to the integrated portion, and wherein the integrated portion includes a third locking claw locked to the second locking claw.

3. The hollow chamber blocking tool according to claim 2, wherein the steel plate fixing portion includes a first protrusion portion having the first locking claw formed on an outer surface and the second locking claw formed on an inner surface, wherein the integrated portion includes a second protrusion portion having the third locking claw formed on an outer surface, and wherein at least a pair of the first protrusion portions are symmetrically disposed about a fixed axis of the steel plate fixing portion and the integrated portion.

4. The hollow chamber blocking tool according to claim 2, wherein the steel plate fixing portion includes a boss-shaped first protrusion portion with a recess having the first locking claw formed on an outer surface and the second locking claw formed on an inner surface, and wherein the integrated portion includes a second protrusion portion accommodated in the recess and having the third locking claw formed on an outer surface.

5. The hollow chamber blocking tool according to claim 4, wherein the rotating portion includes a hinge portion in addition to the connection portion fixed to the foamable base material of the first blocking tool.

6. The hollow chamber blocking tool according to claim 2, wherein the first blocking tool includes a lip portion sandwiching the steel plate in cooperation with the first locking claw while the first locking claw is locked to the hole edge.

7. The hollow chamber blocking tool according to claim 6, wherein the second holder plate includes a steel plate contact surface contacting the steel plate while the third locking claw is locked to the second locking claw.

8. The hollow chamber blocking tool according to claim 7, wherein the steel plate contact surface contacts a raised portion formed in a flange portion joinable to an outer shell of the hollow chamber in the steel plate.

9. The hollow chamber blocking tool according to claim 1, wherein the hollow chamber blocking tool is applied to a skeleton member of a vehicle.

10. The hollow chamber blocking tool according to claim 5, wherein the hinge portion of the second holder plate has a thickness thinner than a thickness of the connection portion of the second holder plate fixed to the flat portion of the foamable base material of the first blocking tool.

* * * * *